United States Patent
Polzer (10) Patent No.: US 12,083,729 B2
(45) Date of Patent: Sep. 10, 2024

(54) TREATMENT ELEMENT FOR A TREATMENT ELEMENT SHAFT OF A SCREW MACHINE, AND METHOD FOR PRODUCING A TREATMENT ELEMENT

(71) Applicant: Coperion GmbH, Stuttgart (DE)

(72) Inventor: Karl-Conrad Polzer, Weinstadt (DE)

(73) Assignee: Coperion GmbH, Stuttgart (DE)

( * ) Notice: Subject to any disclaimer, the term of this patent is extended or adjusted under 35 U.S.C. 154(b) by 422 days.

(21) Appl. No.: 17/165,214

(22) Filed: Feb. 2, 2021

(65) Prior Publication Data

US 2021/0252763 A1    Aug. 19, 2021

(30) Foreign Application Priority Data

Feb. 17, 2020   (DE) ............... 10 2020 201 895.2

(51) Int. Cl.
*B29C 48/40*     (2019.01)
*B29C 48/395*    (2019.01)
*B29C 48/56*     (2019.01)
*B29C 48/57*     (2019.01)

(52) U.S. Cl.
CPC .......... *B29C 48/402* (2019.02); *B29C 48/397* (2019.02); *B29C 48/56* (2019.02); *B29C 48/57* (2019.02)

(58) Field of Classification Search
CPC .... B29C 48/402; B29C 48/397; B01F 27/052
USPC .......................................................... 366/82
See application file for complete search history.

(56) References Cited

U.S. PATENT DOCUMENTS

| | | | |
|---|---|---|---|
| 4,215,942 A | | 8/1980 | Seufert et al. |
| 4,949,836 A | * | 8/1990 | Schostek ............... B23K 35/32 425/168 |
| 5,135,378 A | * | 8/1992 | Catton .................. B29C 48/40 425/168 |
| 6,155,705 A | * | 12/2000 | Douris ................ B29C 48/509 366/79 |
| 6,346,293 B1 | | 2/2002 | Douris et al. |
| 2005/0249030 A1 | * | 11/2005 | Williams ............. B29C 48/507 366/79 |

FOREIGN PATENT DOCUMENTS

| | | |
|---|---|---|
| DE | 3718779 A1 | 12/1988 |
| DE | 69817521 T2 | 6/2004 |
| EP | 0001970 A1 | 5/1979 |
| JP | 2010188626 A | 9/2010 |
| WO | 2018033353 A1 | 2/2018 |

OTHER PUBLICATIONS

International Tungsten Industry Association, https://www.itia.info/wc-and-co.html, 2011.*
German Application No. 10 2020 201 895.2, International Search Report dated Oct. 14, 2020.

* cited by examiner

*Primary Examiner* — Marc C Howell
(74) *Attorney, Agent, or Firm* — Dinsmore & Shohl LLP (57) ABSTRACT

A treatment element for a treatment element shaft of a screw machine comprises a main body with an outer wall, wherein the outer wall has a first wall section and a second wall section and wherein the first wall section is harder than the second wall section.

11 Claims, 7 Drawing Sheets

TREATMENT ELEMENT FOR A TREATMENT ELEMENT SHAFT OF A SCREW MACHINE, AND METHOD FOR PRODUCING A TREATMENT ELEMENT

CROSS-REFERENCES TO RELATED APPLICATIONS

This application claims the priority of German Patent Application, Serial No. DE 10 2020 201 895.2, filed Feb. 17, 2020, the content of which is incorporated herein by reference in its entirety as if fully set forth herein.

FIELD OF THE INVENTION

The invention relates to a treatment element for a treatment element shaft of a screw machine. The invention furthermore relates to a treatment element shaft having a treatment element of said type and to a screw machine having a treatment element shaft of said type. The invention also relates to a method for producing a treatment element for a treatment element shaft of a screw machine.

BACKGROUND OF THE INVENTION

WO 2018/033 353 A1 has disclosed a multi-shaft screw machine comprising a housing main body with two housing bores and comprising two treatment element shafts arranged in the housing bores. The treatment element shafts each comprise multiple treatment elements in the form of screw elements and kneading elements with in each case one outer wall for interacting with the plastics material for treatment. The treatment elements are designed to mesh sealingly with one another. The sealingly meshing design of the treatment elements has an influence on the conveying and shear characteristics thereof and can lead to an increased tendency for wear to occur.

SUMMARY OF THE INVENTION

The invention is based on an object of creating an improved treatment element for a treatment element shaft of a screw machine, which treatment element is particularly robust and economical in operation. It is in particular also the intention for the treatment element to positively influence the substance preparation in the screw machine.

This object is achieved by means of a treatment element for a treatment element shaft of a screw machine, comprising a main body with an outer wall, wherein the outer wall has a first wall section and a second wall section, wherein the first wall section is harder than the second wall section. According to the invention, it has been identified that an outer wall of the main body of the treatment element can have a first wall section which is harder than a second wall section of the outer wall, whereby the treatment element is particularly robust and resistant to wear and is thus particularly economical in operation. In particular, the relatively hard form of the first wall section ensures the reduction of wear in a region of the outer wall which interacts with a housing of the screw machine and/or which interacts in sealingly meshing fashion with the outer wall of a treatment element of an adjacent treatment element shaft. The first wall section is resistant to relatively high loads owing to its relatively high hardness. The robustness of the treatment element is benefited in particular by the fact that the first wall section is supported, in particular mounted in soft and/or damped fashion, by the second wall section of relatively low hardness. The brittle fracture tendency of the treatment element, in particular of the second wall section, is thus reduced. The increased wear resistance of the treatment element leads to greater or more durable dimensional accuracy of the treatment element and of the treatment element shaft. The substance preparation is thus positively influenced.

The outer wall is to be understood to mean that wall of the main body which comes into contact with a material or substance for treatment. The substance for treatment may be a plastics material, in particular a plastics material with additives. The main body preferably comprises an inner wall for interacting with a support shaft. The inner wall is preferably formed as a hub with a toothing. The main body preferably has two connection walls for interacting with a respective adjacent treatment element of the same treatment element shaft, which is connected rotationally conjointly to the same support shaft. Preferably, the outer wall outwardly fully delimits the main body in a radial direction with respect to an axis of rotation of the treatment element. The treatment element is rotatable, in particular can be driven in rotation, about the axis of rotation for the treatment of the substance. The inner wall is preferably formed concentrically with respect to the axis of rotation.

The treatment element may be formed as a screw element and/or as a kneading element. The treatment element may be of single-start or multi-start, in particular two-start or three-start, form. The kneading element may have one or more kneading discs. The screw element and/or the kneading element are preferably formed as a single piece.

Preferably, the first wall section is formed by a first material layer and the second wall section is formed by a second material layer. The second material layer is preferably a base material of the main body. It is preferable if the mass of the base material forms at least 50%, in particular at least 70%, in particular at least 90%, in particular at least 95%, of a mass of the treatment element. It is advantageously achieved in this way that the relatively hard, first material layer is supported with low stresses, in particular in damped fashion, by the second material layer. As base material, use may for example be made of the steel 1.4112. The layer thickness of the first material layer and/or of the second material layer is preferably at least 0.5 mm and at most 5 mm.

According to one aspect of the invention, the first material layer is cohesively connected, in particular welded, to the second material layer.

The first material layer differs from the second material layer preferably by the material composition and/or the material structure. Different material compositions can be ensured for example through the provision of different metal alloys, produced in particular by build-up welding. Different material structures can be obtained for example by means of heat treatment, in particular laser hardening. The first material layer may for example be present predominantly in a martensite phase, and the second material layer may be present predominantly in an austenite phase. The treatment element can thus be produced particularly economically, and in particular the first wall section and the second wall section can be of particularly efficient form.

The first material layer and/or the second material layer may differ from the base material. The base material may be harder and/or softer than the first wall section and/or the second wall section.

The harder form of the first wall section in relation to the second wall section may be realized by treatment of the base material and/or by deposition of a material layer onto the base material. The treatment may comprise a heat treatment, in particular surface hardening, diffusion hardening (nitriding, nitrocarburizing), electron beam hardening, laser hardening and/or inductive hardening.

The hardness of the wall sections is for example determined in accordance with the Brinell (HB) method according to DIN EN ISO 6506-1 or Vickers (HV) method according to DIN EN ISO 6507-1 or in accordance with the Rockwell (HRC) method according to DIN EN ISO 6508.

To form the at least one first wall section, the first material layer, which is preferably applied to the main body by material deposition, preferably comprises at least one material selected from the following materials: cobalt-based alloys (Stellite) based in particular on CoCr, NiCrBSi-based alloys, powder metallurgical tool steels with or without a hard substance fraction and based on iron, composite materials composed of at least one of the above-stated materials with additional carbidic and/or nitridic hard substance inclusions, CrN, TiAlN, TIC, WC, CrC, ceramics.

To form the second wall section, the second material layer, which is preferably applied to the main body by layer deposition, preferably comprises at least one material selected from the following materials: high-grade steel, low-alloyed steel, nickel-based material, NiCr70Nb, aluminium, brass, bronze, for example Al bronze, Cu bronze, Ni bronze, Waukesha alloys. The first material layer and the second material layer preferably comprise a metal, in particular a steel.

According to one aspect of the invention, the first wall section and/or the second wall section is formed as a crack stopper for the prevention of the formation and/or the propagation of cracks. Preferably, a main extent direction of the first wall section and/or of the second wall section is oriented transversely with respect to a crack progression direction, in particular perpendicular and/or at an angle in a range from 30° to 60° with respect to the axis of rotation. Preferably, the main extent direction of the first wall section and/or of the second wall section is oriented obliquely with respect thereto, in particular perpendicular to the axis of rotation. The formation and growth of cracks can thus be reliably prevented. In particular, the second wall section is suitable for stopping cracks owing to its relatively low hardness.

According to one aspect of the invention, the first wall section and/or the second wall section are of uninterrupted form. The first wall section and/or the second wall section may, in plan view, be formed in the shape of a polygon, in particular of a rectangle, in particular of a square, and/or of circular and/or elliptical form.

The first wall section and/or the second wall section may have a cross-sectional area which is configured to taper in a direction perpendicular to the outer wall, in particular in the direction of the axis of rotation. The cross-sectional area may for example be of triangular or trapezoidal or circular-segment-shaped form. A corresponding cross section is easy to produce. The main extent of the first or of the second wall section respectively is definitive for the determination of the cross-sectional area. According to one aspect of the invention, the cross-sectional area is oriented perpendicular to the axis of rotation.

According to one aspect of the invention, the first wall section projects beyond an envelope spanned by the second wall section. In this way, the first wall section projects beyond the second wall section perpendicularly with respect to the outer wall, in particular radially with respect to the axis of rotation. Alternatively, the first wall section and the second wall section may be formed flush with respect to one another. In particular, the first wall section may coincide with an envelope of the second wall section.

The projection of the first wall section in relation to the second wall section perpendicularly with respect to the outer wall, in particular in an outward direction, may be formed during the production of the treatment element and/or by abrasion of the second wall section during operation.

A treatment element comprising several of the first wall sections and several of the second wall sections, is particularly robust and economical in operation. Preferably, the outer wall comprises several of the first wall sections and/or several of the second wall sections. For example, the first wall sections and the second wall sections may be arranged alternately with respect to one another. Preferably, the first wall sections and the second wall sections are oriented parallel to one another, in particular are arranged in the manner of lamellae. The first wall sections may be of geometrically identical or different form in relation to one another. The same preferably applies to the second wall sections. Furthermore, the first wall sections may be of geometrically identical form in relation to the second wall sections.

A treatment element configured such that the first wall section is harder by at least 50 HV 10 than the second wall section, is particularly wear-resistant. The first wall section is preferably harder by at least 50 HV 10, in particular at least 75 HV 10, in particular at least 100 HV 10, in particular at least 150 HV 10, in particular at least 200 HV 10, than the second wall section. Preferably, several of the first wall sections have the same hardness. A deviation of the hardnesses of the several first wall sections is preferably at most 50 HV 10, in particular at most 20 HV 10, in particular at most 10 HV 10. The same preferably applies to the several second wall sections.

A treatment element configured such that only the first wall section lies on a lateral surface of revolution of the main body, is particularly robust in operation. The lateral surface of revolution of the main body is defined by the circumferential surface that is spanned in the case of the complete rotation of the main body around the axis of rotation. The end surfaces of the envelope spanned in this way do not belong to the lateral surface of revolution. The wall sections that coincide with the lateral surface of revolution can come into contact with an inner wall of a housing of the screw machine. By virtue of the fact that the first, relatively hard wall section lies on the lateral surface of revolution of the main body, in particular coincides therewith, wear caused by contact with the housing can be reduced. In a manner dependent on the mounting of the treatment element shaft and a gap between the treatment element and the housing, contact between the treatment element and the housing can also be prevented. Increased shear loads then commonly arise in the region between the treatment element and the housing owing to the substance for treatment. The arrangement of the first wall section in the region of the lateral surface of revolution thus likewise has the effect of reducing wear on this thus highly loaded region.

A treatment element configured such that the outer wall has a ridge section and a base section, wherein the first wall section and/or the second wall section are arranged on the ridge section and/or on the base section, is particularly robust in operation. In a manner dependent on whether a single-start or a multi-start treatment element is present, the outer wall may have at least one base section and at least one ridge section. The ridge section comprises that section of the outer wall which is furthest remote from the axis of rotation in a radial direction. The outer wall is preferably composed of the at least one ridge section and the at least one base section. Preferably, the first wall section is arranged both on the ridge section and on the base section. The treatment element is preferably designed for sealing meshing. By virtue of the fact that adjacent treatment elements of different element shafts mesh sealingly with one another, the base sections are also subjected to high loads, in particular owing to sliding friction and/or an increased shear action of the substance for treatment. The arrangement of the at least one first wall section also on the base section makes the treatment element particularly robust with respect to corresponding loads. The ridge section is in particular a screw ridge or a kneading element ridge.

A treatment element configured such that the treatment element is formed as a screw element, wherein a main extent direction of the first wall section and/or of the second wall section is oriented parallel and/or transversely with respect to a helical line of the screw element, can be produced particularly economically and is particularly robust in operation. An orientation of the first wall section and/or of the second wall section parallel to the helical line improves the conveying characteristics of the screw element. Preferably, several of the first wall sections are provided on the ridge section of the screw element. A sealing action between the screw element and the housing can thus be improved. The conveying performance of the screw element is hereby increased. A formation of cracks and/or a propagation of cracks transversely with respect to the helical line can thus be prevented. The first wall section and/or the second wall section may be arranged transversely, in particular perpendicularly, with respect to the helical line. In this way, a shear action between the treatment element and the housing is improved.

A treatment element configured such that the first wall section and/or the second wall section are of strip-like form, is particularly robust in operation and can be produced particularly economically. The strip-like form is to be understood to mean that an aspect ratio of the first wall section and/or of the second wall section is at least 5, in particular at least 10, in particular at least 15, in particular at least 20. The aspect ratio is preferably at most 10,000, in particular at most 5000, and in particular at most 1000. Preferably, the first wall section and/or the second wall section has a constant transverse extent transversely with respect to the respective main extent direction. In particular, several of the first wall sections are arranged in alternating fashion with respect to several of the second wall sections. By means of a correspondingly lamellar arrangement, the preparation of the substance or material can be positively influenced.

The at least one first wall section and the at least one second wall section may be formed so as to cross one another. The crack-stopping function of the first wall section and/or of the second wall section is hereby yet further improved. The conveying characteristics and the shear characteristics of the treatment element are also hereby improved.

A treatment element configured such that the first wall section and/or the second wall section are oriented parallel and/or perpendicular to an axis of rotation of the treatment element, is particularly wear-resistant and ensures positive influencing of the preparation of the substance for treatment. Preferably, the first wall section and/or the second wall section are, in the region of the lateral surface of revolution, oriented parallel and/or perpendicular to the axis of rotation. In particular, the strip-like first wall section may, in the region of the lateral surface of revolution, be oriented parallel to the axis of rotation. It is advantageously achieved in this way that the shear action on the substance for treatment and the sealing action with respect to the housing are increased. The first wall section and/or the second wall section may also be oriented obliquely with respect to the axis of rotation.

A treatment element configured such that the first wall section and the second wall section are oriented parallel to one another, is particularly wear-resistant. By means of the parallel orientation of the first wall section and of the second wall section, in particular of several alternately arranged first wall sections and second wall sections, these can be subjected to particularly uniform loading. Load peaks can be reduced, whereby the treatment element is particularly robust.

A treatment element configured such that the first wall section and/or the second wall section surrounds an axis of rotation of the treatment element over at least 180°, is particularly robust in operation and can be produced particularly economically. Preferably, the first wall section and/or the second wall section surround the axis of rotation over at least 180°, in particular over at least 270°, in particular over at least 360°, in particular over at least 720°. The friction resistance with respect to the housing and/or with respect to adjacent treatment elements can be reduced by means of the guiding action of the first and/or of the second wall section. The uninterrupted form over a corresponding angle range ensures improved conveyance of the substance for treatment. Preferably, the first wall section and/or the second wall section are in this case of strip-like form.

According to one aspect of the invention, the first wall section and/or the second wall section extend over at least 50%, in particular at least 80%, in particular at least 100%, of a thread turn of the screw element and/or of an extent of a kneading disc of the kneading element in a conveying direction and/or in a circumferential direction. The first wall section and/or the second wall section may also extend over more than one thread turn, in particular over more than two thread turns, of the screw element.

A treatment element configured such that the first wall section and/or the second wall section are produced by material deposition, is particularly robust in operation and can be produced particularly economically. The material deposition may be performed for example by build-up welding and/or by hot isostatic pressing. Preferably, the first wall section projects beyond an envelope formed by the second wall section, in particular outwards in a radial direction with respect to the axis of rotation.

Furthermore, the first wall section and/or the second wall section may be produced by material removal. The material removal may be performed chemically, in particular in an etching process, and/or mechanically, in particular by cutting, in particular in a milling process. For example, the second wall section may be formed by material removal. For the chemical removal of material, those sections at which no material removal is to be performed are preferably firstly masked. In particular, in this way, the first wall section can project outwards beyond the second wall section, in particular beyond an envelope spanned by the second wall section.

A treatment element configured such that the first wall section and/or the second wall section form a profiling of the outer wall, ensures particularly high conveying and shear performance and is robust in operation. To form the profiled outer wall, this preferably comprises several of the first and several of the second wall sections. The first wall sections and/or the second wall sections are preferably in each case offset with respect to one another perpendicularly in relation to the outer wall. In particular, the first wall sections and/or the second wall sections deviate from an envelope respectively spanned by the other wall sections. For example, the first wall sections form peak sections and the second wall sections form trough sections or vice versa. In the case of the strip-like form of the first wall section and/or of the second wall sections, it is thus possible for a surface which is structured in lamellar form to be provided. Alternatively, the outer surface may have insular elevations, preferably in the form of the first wall sections.

The invention is furthermore based on the object of creating an improved treatment element shaft which is particularly economical in operation, in particular is wear-resistant, and/or positively influences a substance preparation.

Said object is achieved by means of a treatment element shaft having at least one treatment element according to the invention, and a support shaft to which the at least one treatment element is rotationally conjointly attached. The advantages of the treatment element shaft according to the invention correspond to the advantages of the above-described treatment element. In particular, the treatment element shaft can be refined with the features of the treatment element. According to one aspect of the invention, the treatment element shaft comprises at least one screw element and at least one kneading element. The treatment element shaft may also comprise exclusively screw elements or exclusively kneading elements. Preferably, the treatment element shaft is designed to interact in sealingly meshing fashion with the housing and/or with an adjacent treatment element shaft. The treatment element shaft may comprise similar and/or different screw elements and/or kneading elements according to the invention.

The invention is furthermore based on an object of creating a screw machine which is particularly economical in operation, in particular which requires particularly little maintenance and/or which positively influences a substance preparation.

Said object is achieved by means of a screw machine comprising at least one treatment element shaft according to the invention, and a housing, having a housing main body, and at least one housing bore which is formed in the housing main body and in which the at least one treatment element shaft is arranged at least in certain sections. The screw machine may be a single-shaft screw machine or a multi-shaft screw machine, in particular a two-shaft screw machine. The advantages of the screw machine according to the invention correspond to the advantages of the above-described treatment element shaft and of the treatment element. In particular, the screw machine may be refined with the features of the treatment element shaft and of the treatment element. The housing main body preferably comprises multiple housing sections which are reversibly connectable to one another. The at least one treatment element shaft is preferably designed to mesh sealingly with the housing. In the case of a multi-shaft screw machine, the treatment element shafts are preferably designed to mesh sealingly with one another. Furthermore, in the case of a multi-shaft screw machine, the treatment element shafts can preferably be driven in rotation in opposite directions.

According to one aspect of the invention, the screw machine comprises a drawing-in zone and/or a melting zone and/or a plasticizing zone and/or a degassing zone and/or a homogenizing zone and/or a conveying and mixing zone and/or a pressure build-up zone, in which at least one treatment element according to the invention is arranged.

The invention is furthermore based on an object of creating an improved method for producing a treatment element.

Said object is achieved by means of a method for producing a treatment element for a treatment element shaft of a screw machine, comprising the steps: providing a main body with an outer wall, forming a first wall section and a second wall section of the outer wall such that the first wall section is harder than the second wall section. The advantages of the method according to the invention correspond to the advantages of the screw machine described above, of the treatment element shaft and of the treatment element. In particular, the method may be refined with the features of the screw machine, of the treatment element shaft and of the treatment element. The method according to the invention is preferably part of a method for producing the treatment element shaft and/or the screw machine.

Further features, advantages and details of the invention will emerge from the following description of multiple exemplary embodiments.

DESCRIPTION OF THE PREFERRED EMBODIMENTS

Figure 1:
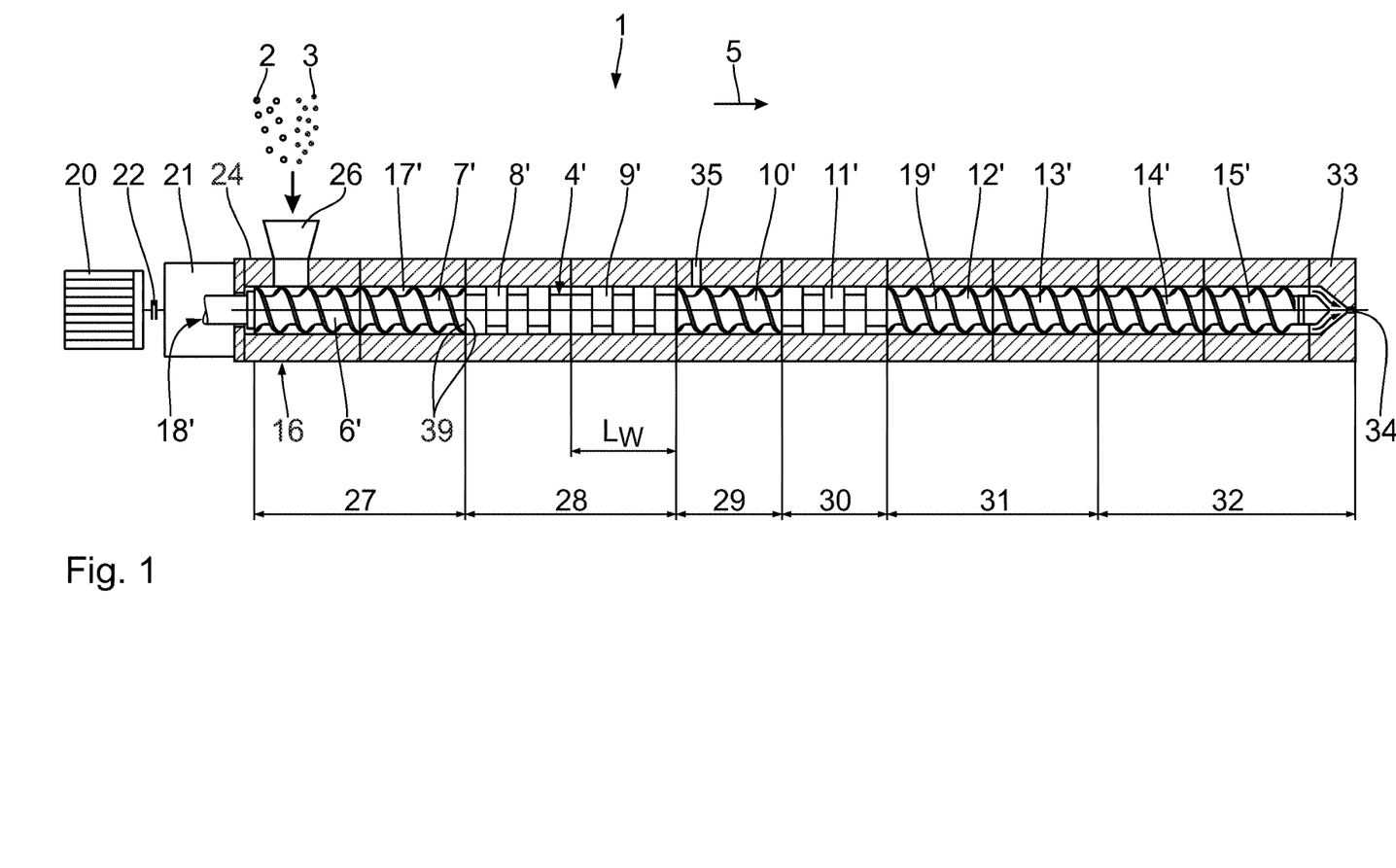
FIG. 1 shows a partially sectional side view of a multi-shaft screw machine having a housing and having two treatment element shafts, which each comprise multiple treatment elements.
Figure 2:
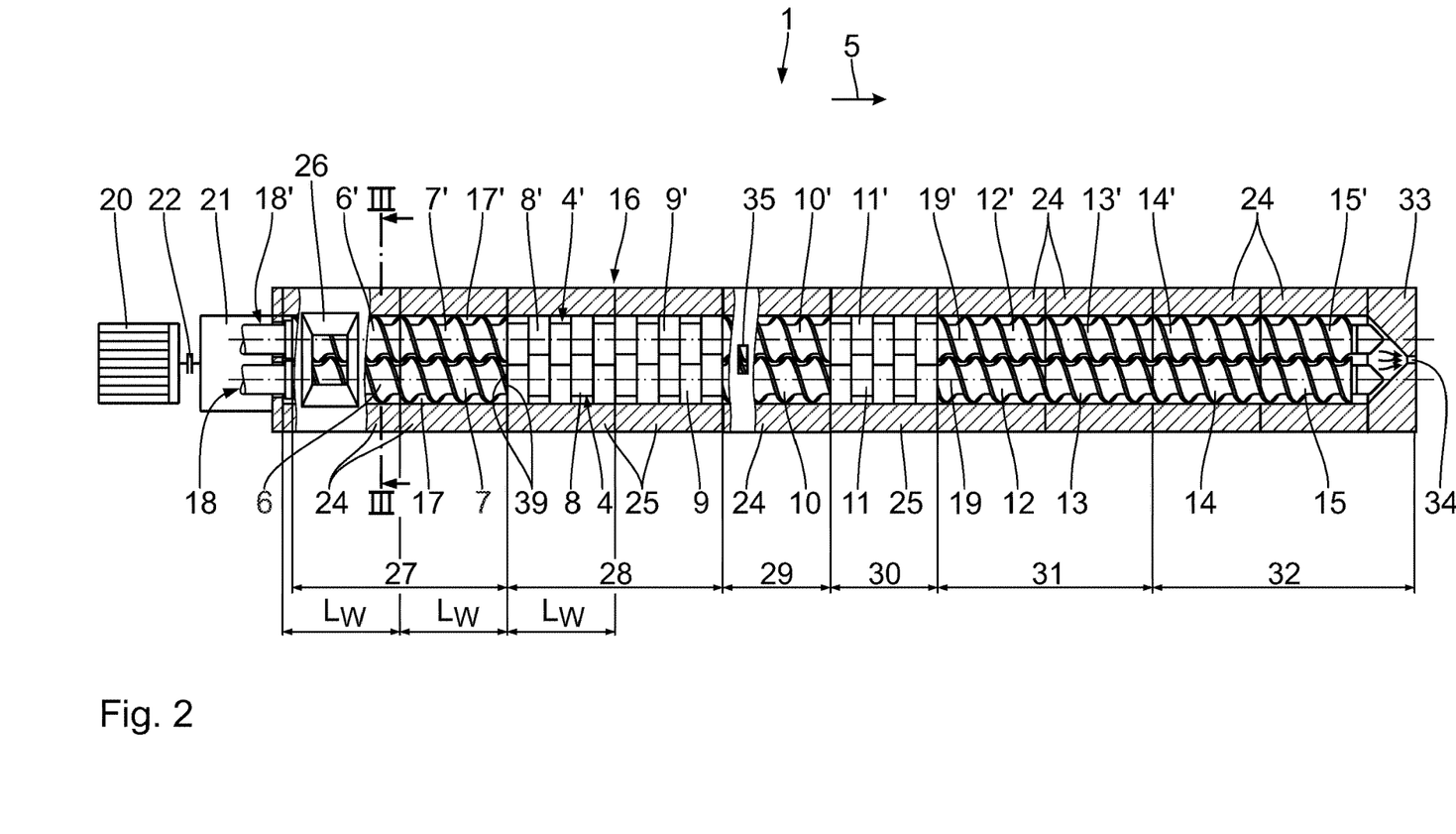
FIG. 2 shows a partially sectional plan view of the multi-shaft screw machine in FIG. 1.

A screw machine 1 for the preparation of a substance or plastics material 2 will be described on the basis of FIG. 1 to FIG. 3. The plastics material may comprise additives 3. The screw machine 1 is in the form of a multi-shaft screw machine, in particular in the form of a two-shaft screw machine.

The screw machine 1 has a first treatment element shaft 4 and a second treatment element shaft 4'. To distinguish between the components of the first treatment element shaft 4 and of the second treatment element shaft 4', the reference designations relating to the second treatment element shaft 4' have the suffix '. Along a conveying direction 5, the treatment element shafts 4, 4' each comprise multiple treatment elements 6 to 15 or 6' to 15' respectively, which are arranged in series. The treatment element shafts 4, 4' are arranged rotatably in a housing 16 of the screw machine 1. The housing 16 comprises a housing main body 16a. In the housing main body 16a, there are arranged two mutually parallel housing bores 17, 17'. The first treatment element shaft 4 is arranged in a first housing bore 17, and the second treatment element shaft 4' is arranged in a second housing bore 17'. The first housing bore 17 and the second housing bore 17' are oriented parallel to one another and overlap one another such that, in cross section, they have the shape of a figure of eight lying on its side. The treatment element shafts 4, 4' are arranged concentrically with respect to the housing bores 17, 17'.

The first treatment element shaft 4 has a first support shaft 18 to which the treatment elements 6 to 15 are rotationally conjointly attached. The second treatment element shaft 4' correspondingly comprises a second support shaft 18' to which the treatment elements 6' to 15' are rotationally conjointly attached. The treatment element shafts 4, 4' are each mounted so as to be rotatable about an axis of rotation 19, 19' oriented parallel to the conveying direction 5. The treatment element shafts 4, 4' can be driven in rotation by means of a drive motor 20. A distribution transmission 21 is arranged between the treatment element shafts 4, 4' and the drive motor 20, wherein a clutch 22 is arranged between the drive motor 20 and the distribution transmission 21. The treatment element shafts 4, 4' are driven in the same sense, that is to say in the same directions of rotation 23, 23', about the respective axis of rotation 19, 19'.

The housing 16 comprises housing sections 24, 25. On a first housing section 24 along the conveying direction 5, there is arranged a material feed 26 in the form of a funnel through which the plastics material 2 for preparation, and possibly the additives 3, can be introduced into the housing bores 17, 17'.

The screw machine 1 has, in series in the conveying direction 5, a drawing-in zone 27, a melting zone or plasticizing zone 28, a degassing zone 29, a homogenizing zone 30, a conveying zone and mixing zone 31, and a pressure build-up zone 32. The housing 16 comprises a nozzle plate 33 which is connected to the final housing section 24 in the conveying direction 5. The nozzle plate 33 has a discharge opening 34.

The treatment elements 6, 6', 7, 7' 10, 10', 12, 12', 13, 13', 14, 14', 15, 15' are in the form of screw elements. The treatment elements 8, 8', 9, 9', 11, 11' are in the form of kneading elements. The housing sections belonging to the treatment elements 6, 6', 7, 7' 10, 10', 12, 12', 13, 13', 14, 14', 15, 15' in the form of screw elements are denoted by the reference designation 24. The housing sections denoted by the reference designation 25 interact with the treatment elements 8, 8', 9, 9', 11, 11' in the form of kneading elements.

The kneading elements 8, 8', 9, 9', 11, 11' have kneading discs 48 which are arranged so as to be angularly offset with respect to one another and in series in the conveying direction 5. Multiple kneading discs 48 which are arranged adjacent to one another are formed as a single-piece kneading block.

In the drawing-in zone 27, the screw elements 6, 6', 7, 7' are arranged on the respective support shafts 18, 18'. Said screw elements 6, 6', 7, 7' engage into one another so as to be configured to sealingly mesh in pairwise fashion. In the melting zone 28, kneading elements 8, 8', 9, 9' are arranged on the support shafts 18, 18', which kneading elements are likewise configured to sealingly mesh in pairwise fashion. In the subsequent degassing zone 29, screw elements 10, 10' which sealingly mesh with one another are in turn arranged on the support shafts 18, 18'. The housing section 24 belonging to the degassing zone 29 has a degassing opening 35 for the degassing of the plastics material 2 for treatment. In the subsequent homogenizing zone 30, kneading elements 11, 11' which sealingly mesh with one another are arranged on the support shafts 18, 18'. Furthermore, in the subsequent conveying zone and mixing zone 31, screw elements 12, 12', 13, 13' which sealingly mesh with one another are arranged on the support shafts 18, 18'. Correspondingly, in the subsequent pressure build-up zone 32, the screw elements 14, 14', 15, 15' are arranged on the support shafts 18, 18'. The treatment elements 6 to 15, 6' to 15' are for example of single-start or two-start form.

Figure 3:
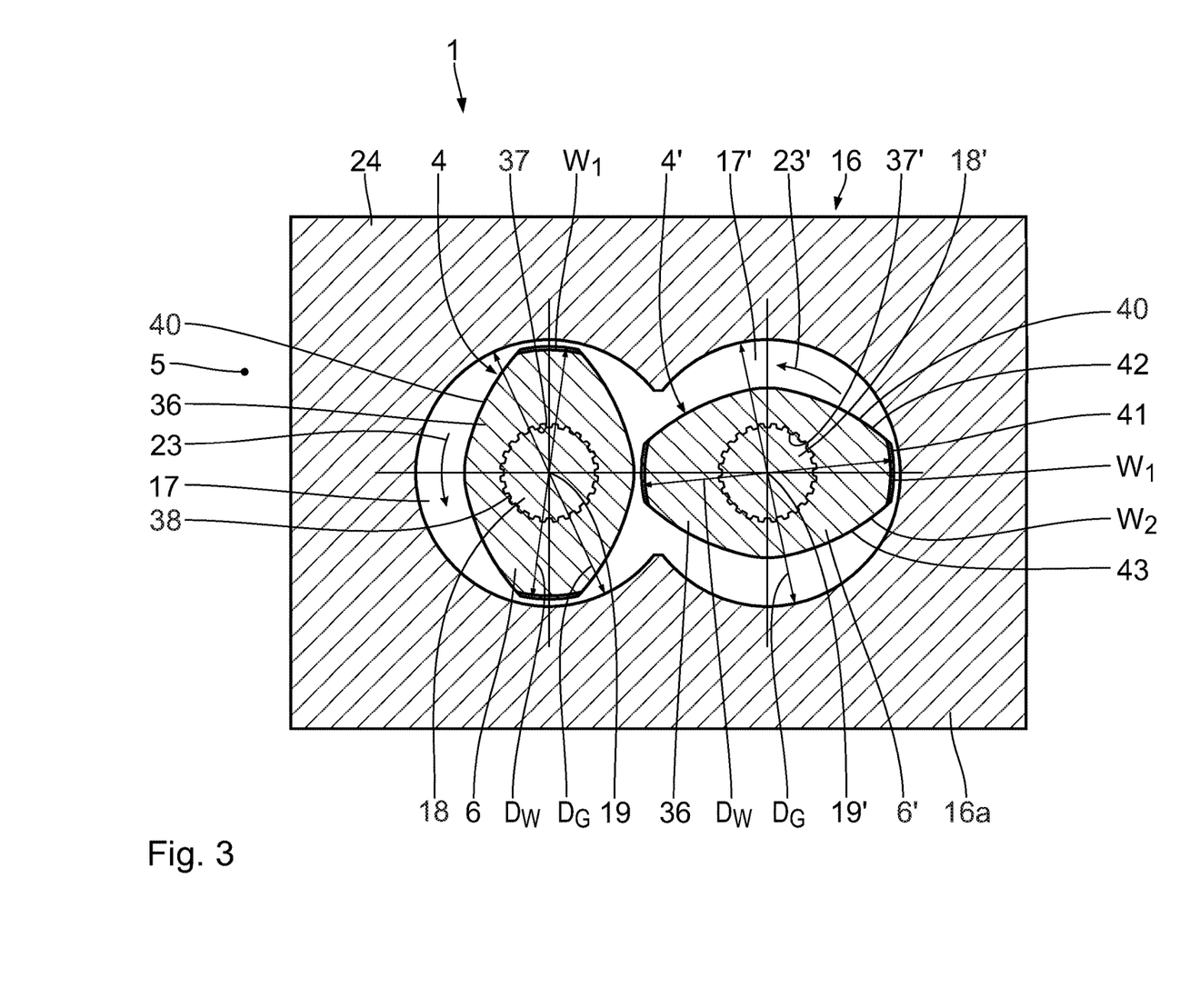
FIG. 3 shows a cross section through the multi-shaft screw machine along the section line III-III in FIG. 2.

FIG. 3 illustrates the screw machine 1 in a cross section. The treatment elements 6 to 15, 6' to 15' each have a main body 36. The respective main body 36 is extended through by a shaft bore 37, 37'. The shaft bores 37, 37' are in the form of hubs with a toothing. For the rotationally conjoint connection of the support shafts 18, 18' to the treatment elements 6 to 15, 6' to 15', the support shafts 18, 18' have a corresponding undulating profile which interacts in positively locking fashion with the hub profiles of the shaft bores 37, 37'. The central longitudinal axes of the shaft bores 37, 37' coincide with the central longitudinal axes of the housing bores 17, 17' and the axes of rotation 19, 19'. The shaft bore 37 is delimited by an inner wall 38. The main body 36 is furthermore delimited by connection walls 39 between two treatment elements 6 to 15, 6' to 15' which are adjacent along the conveying direction 5. The main body 36 is furthermore delimited by an outer wall 40. The outer wall 40 comes into contact with the plastics material 2 and is designed to act on the plastics material 2.

The main body 36 has a length $L_W$ in the conveying direction 5. The shaft bore 37 extends in the conveying direction 5 through the entire main body 36, such that the shaft bore 37 also has the length $L_W$. The treatment elements 6 to 15, 6' to 15' have the outer diameter $D_W$. The housing bores 17, 17' have the diameter DG.

The outer wall 40, both of the screw elements and of the kneading elements, comprises in each case one ridge section 41 and one base section 42. In the region of the ridge section 41, the outer wall 40 has the outer diameter $D_W$. The base section 42 forms flanks 43 of the treatment elements 6 to 15, 6' to 15'.

Figure 4:
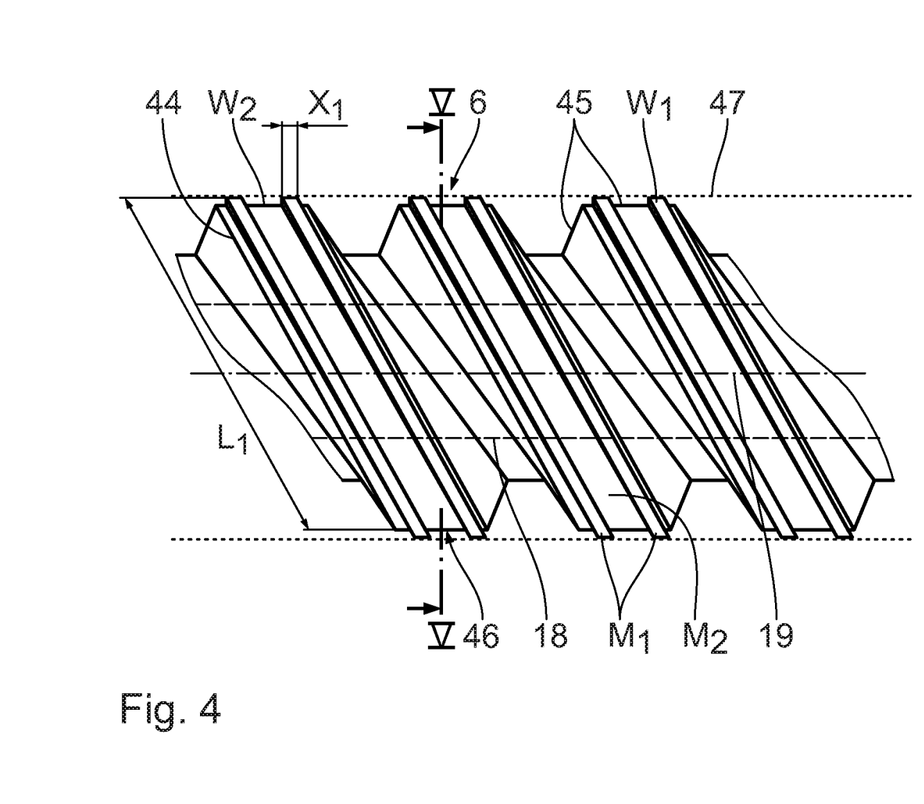
FIG. 4 shows a side view of a treatment element in the form of a screw element according to a first exemplary embodiment.

FIG. 4 illustrates the screw element 6 in further detail. The outer wall 40 comprises multiple first wall sections $W_1$ and multiple second wall sections $W_2$. The first wall sections $W_1$ are of strip-like form and run parallel to a helical line 44 of the screw element 6. Altogether, the outer wall 40 comprises two of the first wall sections $W_1$. Both wall sections $W_1$ are arranged in the ridge section 41. The second wall sections $W_2$ form the remaining surface of the outer wall 40. The second wall sections $W_2$ extend over the ridge section 21 and the base section 42.

The first wall sections $W_1$ have a dimension $X_1$ perpendicular to their main extent direction and in the conveying direction 5. Along their main extent direction, the first wall sections $W_1$ have a dimension $L_1$ which corresponds to the length of the helical line 44. For the ratio $L_1/X_1$, the following applies: $L_1/X_1 \geq 10$. The first wall sections $W_1$ are correspondingly of strip-like form.

Figure 5:
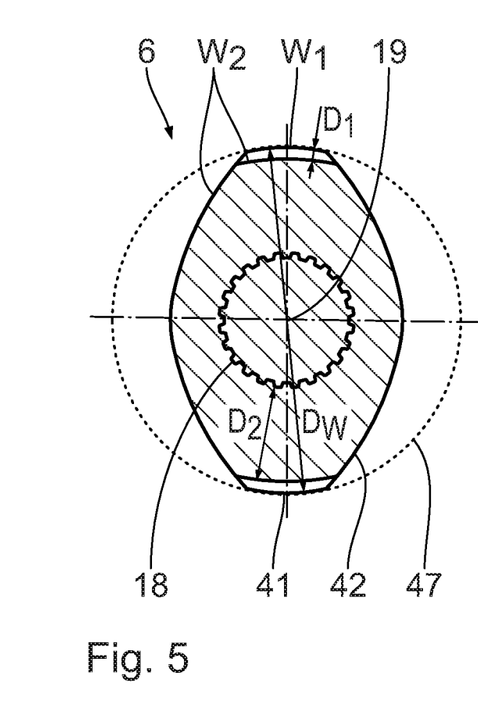
FIG. 5 shows a cross section of the screw element along the section line V-V in FIG. 4.

The first wall sections $W_1$ project outwards in a radial direction, and perpendicularly with respect to the outer wall 40, beyond an envelope 45 spanned by the second wall sections $W_2$. In particular, the first wall sections $W_1$ are formed by deposition of material layers $M_1$. The material layer $M_1$ has a layer thickness $D_1$ in a radial direction with respect to the respective axis of rotation 19, 19'. Preferably, the layer thickness $D_1$ is at least 1 mm and at most 4 mm.

The application of the material layer $M_1$ is performed for example by means of at least one of the following material deposition methods: laser welding, PTA welding (PTA: Plasma Transferred Arc), electrode welding, thermal spraying, hot isostatic pressing, sintering, brazing, additive manufacture, CVD coating (CVD: chemical vapor deposition) and/or PVD coating (PVD: physical vapor deposition), coating by detonation.

To form the first wall sections $W_1$, at least one material of the first material layer $M_1$ is selected from the materials: cobalt-based alloys (Stellite), NiCrBSi-based alloys, powder metallurgical tool steels with or without a hard substance fraction and/or based on iron, composite materials composed of at least one of the above-stated materials, preferably with additional carbidic and/or nitridic hard substance inclusions, CrN, TiAlN, TiC.

The second wall sections $W_2$ are formed by a base material $M_2$ of the main body 36. The second wall sections $W_2$ have a layer thickness $D_2$. The base material $M_2$ is a conventional base material, such as for example the steel material $M_2$. In particular, the material layer $M_1$ is harder than the base material $M_2$. In this way, it is ensured that the first wall section $W_1$ is harder than the second wall section $W_2$. In particular, the first wall section $W_1$ is harder by 100 HV 10 than the second wall section $W_2$.

The outer wall 40 has a profiling 46. The profiling 46 is formed by virtue of the first wall sections $W_1$ projecting, in a radial direction with respect to the axis of rotation 19, beyond the envelope 45 spanned by the second wall sections $W_2$. In the region of the ridge section 41, the first wall sections $W_1$ thus deviate from the second wall sections $W_2$ in a radial direction with respect to the axis of rotation 19. The first wall sections $W_1$ form webs, between which a channel in the form of the second wall section $W_2$ extends. In this way, an improved conveying and sealing action can be attained.

Only the first wall section $W_1$ lies on a lateral surface of revolution 47 of the main body 36. The lateral surface of revolution 47 is defined by the outer envelope spanned in the case of the complete rotation of the respective treatment element 6 to 15, 6' to 15' about the axis of rotation 19, 19'.

Figure 6:
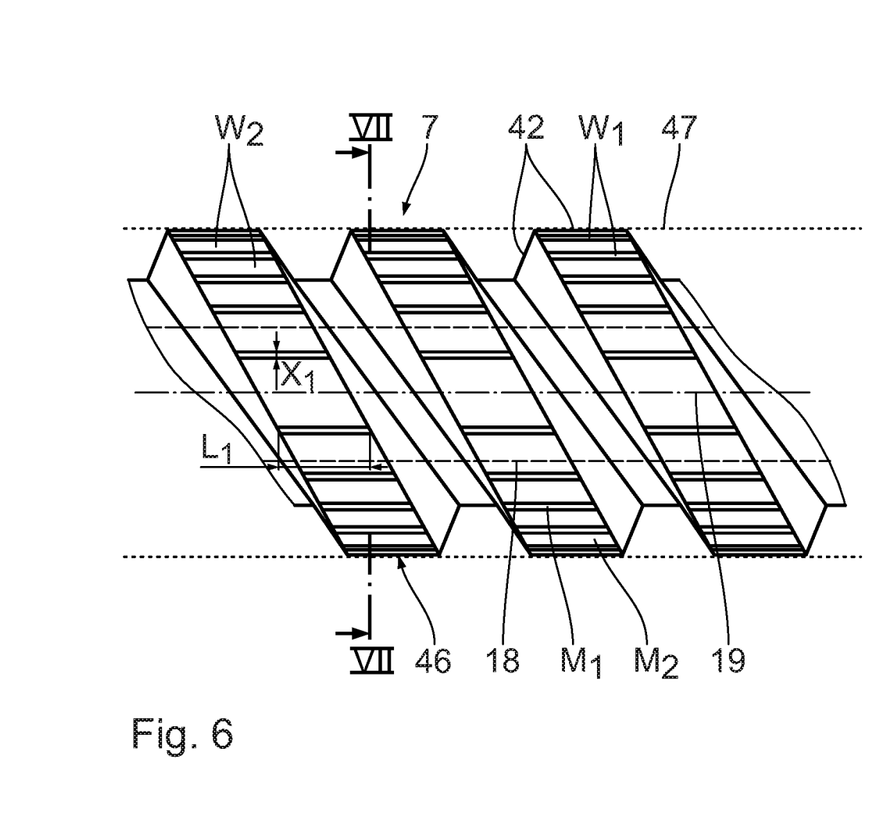
FIG. 6 shows a side view of a treatment element in the form of a screw element according to a further exemplary embodiment.
Figure 7:
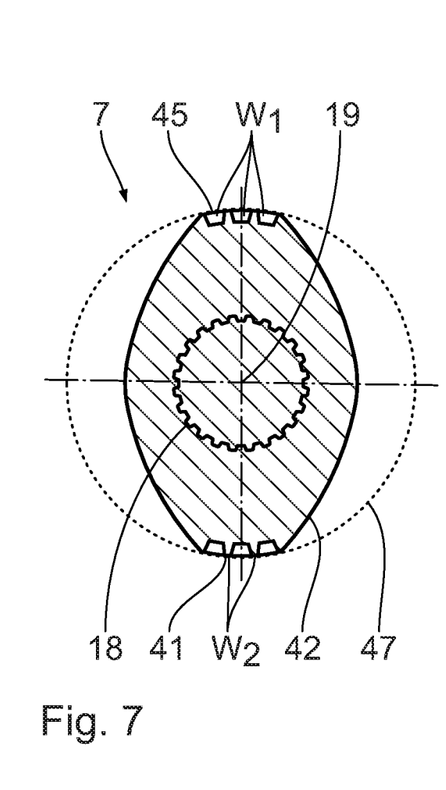
FIG. 7 shows a cross section of the screw element along the section line VII-VII in FIG. 6.

A screw element according to a further exemplary embodiment will be described on the basis of FIG. 6 and FIG. 7. By contrast to the exemplary embodiment described above, the first wall sections $W_1$ arranged on the ridge section 41 are oriented parallel to the axis of rotation 19. The ratio $L_1/X_1$ is at least 0.5 and at most 10. The first wall sections $W_1$ are in turn arranged exclusively on the ridge section 41, and the second wall sections $W_2$ are formed on the ridge section 41 and on the base section 42.

The first wall sections $W_1$ do not project beyond the envelope 45 spanned by the second wall sections $W_2$. Rather, the first wall sections $W_1$ lie on the envelope 45. The second wall sections $W_2$ arranged in the ridge section 41 are oriented parallel to the first wall sections $W_1$. The outer wall 40, in particular the ridge section 41, has no profiling.

The first material layer $M_1$ is formed by hardening of the base material $M_2$. The hardening of the material layer $M_1$ is performed for example by means of at least one of the following hardening methods: case hardening, nitriding, boriding, laser hardening.

Figure 8:
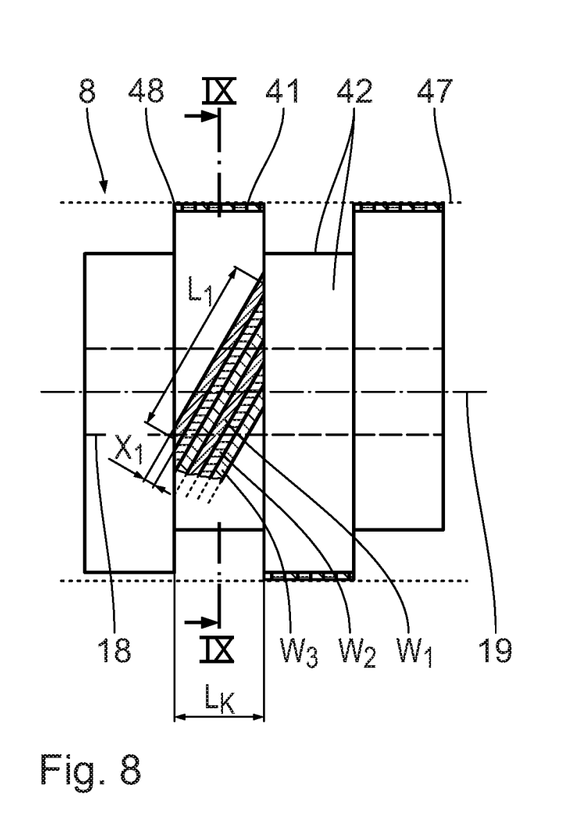
FIG. 8 shows a side view of a treatment element in the form of a kneading element according to a further exemplary embodiment.
Figure 9:
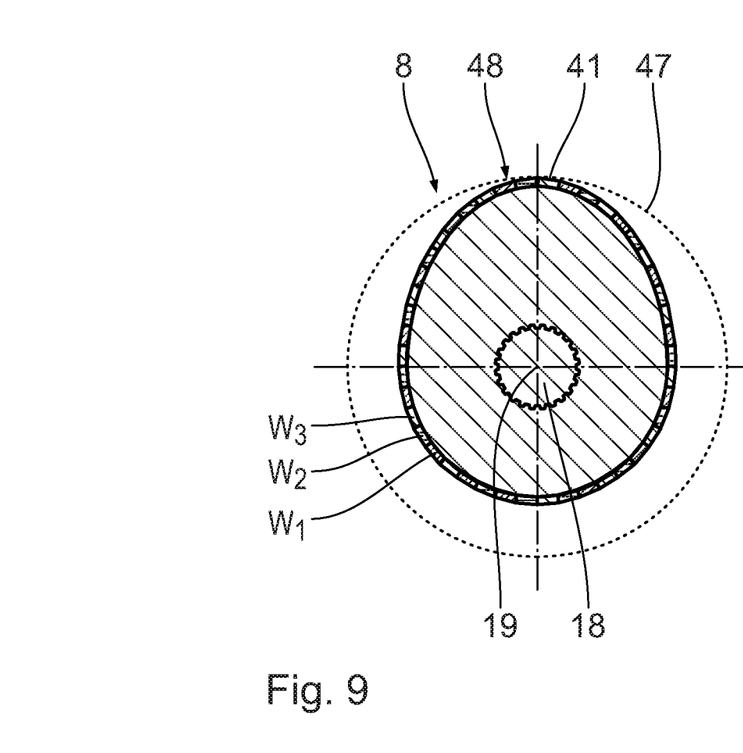
FIG. 9 shows a cross section of the kneading element along the section line IX-IX in FIG. 8.

A further exemplary embodiment will be described on the basis of FIG. 8 and FIG. 9. By contrast to the exemplary embodiments described above, the treatment element 6 to 15, 6' to 15' formed with the first wall sections $W_1$ and the second wall sections $W_2$ is a kneading element 8, 8', 9, 9', 11, 11'. The kneading element 8 comprises third wall sections $W_3$ in addition to the first wall sections $W_1$ and the second wall sections $W_2$. The wall sections $W_1$, $W_2$, $W_3$ are of strip-like form. A main extent direction of the wall sections $W_1$, $W_2$, $W_3$ is oriented obliquely with respect to the axis of rotation 19 and obliquely with respect to a cross-sectional area of the kneading element 8. The wall sections $W_1$, $W_2$, $W_3$ extend in each case over the ridge section 41 and the base section 42.

The third wall sections $W_3$ have a material layer $M_3$, the hardness of which is lower than that of the base material $M_2$.

Figure 10:
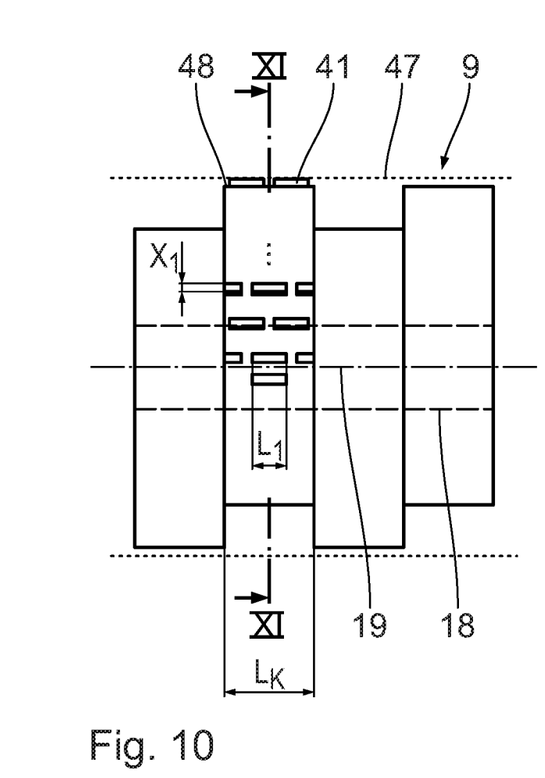
FIG. 10 shows a side view of a treatment element in the form of a kneading element according to a further exemplary embodiment.
Figure 11:
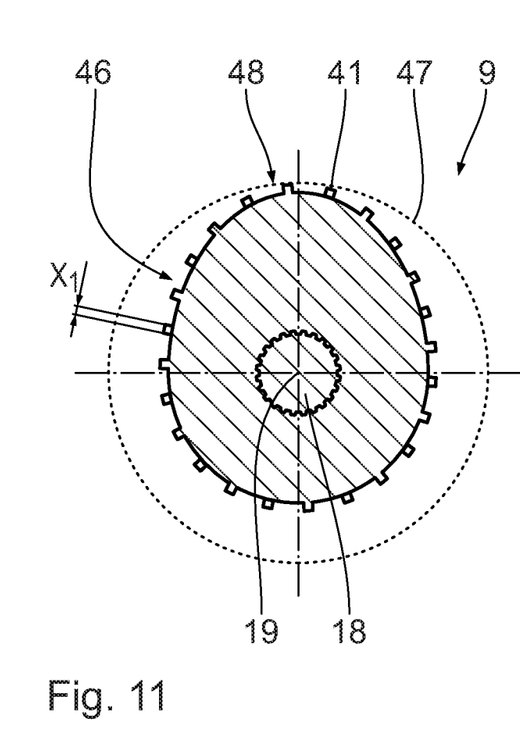
FIG. 11 shows a cross section of the kneading element along the section line XI-XI in FIG. 10.

A further exemplary embodiment of a treatment element 6 to 15, 6' to 15' will be described on the basis of FIG. 10 and FIG. 11 using the example of the kneading element 9. By contrast to the exemplary embodiments described above, a ratio between the dimension $L_1$ of the respective first wall section $W_1$ along the axis of rotation 19 and the dimension $X_1$ of the respective first wall section $W_1$ perpendicular to the dimension $L_1$ parallel to the outer wall 40 is at most 5. In particular, the dimension of the first wall sections $W_1$ is smaller than a length Lx of a kneading disc 48 along the conveying direction 5. The second wall section $W_2$ is of lattice-like form. At least some of the first wall sections $W_1$ are completely surrounded by the second wall section $W_2$. The first wall sections $W_1$ project, in a radial direction with respect to the axis of rotation 19, beyond the envelope 45 spanned by the second wall section $W_2$. The lateral surface of revolution 47 is spanned only by the first wall sections $W_1$.

In general, the formation of the at least one first wall section $W_1$ and of the at least one second wall section $W_2$ may be performed by treatment of the outer wall 40 in a hardening process, in particular by thermal hardening, and/or by material deposition. The at least one first wall section $W_1$ and the at least one second wall section $W_2$ are in contact, during the operation of the screw machine, with the plastics material 2 for treatment. The layer thickness $D_1$ may be less than, equal to or greater than a layer thickness $D_2$ of the second wall section $W_2$. The layer thickness $D_2$ is preferably greater than the layer thickness $D_1$. The material layers $M_1$, $M_2$ may be treated or processed after the deposition. The several first wall sections $W_1$ and/or the several second wall sections $W_2$ may be of identical and/or different form with regard to their geometry and/or hardness and/or material composition.

What is claimed is:

1. A treatment element for a treatment element shaft of a screw machine, comprising:
   a main body with an outer wall,
   wherein:
   the outer wall has several first wall sections and several second wall sections, wherein the first wall sections are harder than the second wall sections,
   the first wall sections are of strip-like form such that an aspect ratio of each of the first wall sections is at least 5,
   wherein the first wall sections and the second wall sections are oriented parallel to one another and are arranged alternately with respect to one another, and
   the treatment element is one of the following:
   a screw element, wherein a main extent direction of the first wall sections is oriented obliquely with respect to a helical line of the screw element, or a kneading element, wherein a main extent direction of the first wall sections is oriented obliquely with respect to an axis of rotation of the treatment element and obliquely with respect to a cross-sectional area of the kneading element.

2. The treatment element according to claim 1, wherein the first wall sections are harder by at least 50 HV 10 than the second wall sections.

3. The treatment element according to claim 1, wherein only the first wall sections lie on a lateral surface of revolution of the main body.

4. The treatment element according to claim 1, wherein the outer wall has a ridge section and a base section, wherein at least one of the first wall sections and the second wall sections are arranged on at least one of the ridge section and on the base section.

5. The treatment element according to claim 1, wherein the second wall sections are oriented at least one of parallel and perpendicular to the axis of rotation of the treatment element.

6. The treatment element according to claim 1, wherein at least one of the first wall sections and the second wall sections surrounds the axis of rotation of the treatment element over at least 180°.

7. The treatment element according to claim 1, wherein at least one of the first wall sections and the second wall sections are produced by material deposition.

8. The treatment element according to claim 1, wherein at least one of the first wall sections and the second wall sections form a profiling of the outer wall.

9. A treatment element shaft, having:
   at least one treatment element according to claim 1, and
   a support shaft to which the at least one treatment element is rotationally conjointly attached.

10. A screw machine, comprising:
    at least one treatment element shaft according to claim 9, and
    a housing, having
        a housing main body, and
        at least one housing bore which is formed in the housing main body and in which the at least one treatment element shaft is arranged at least in certain sections.

11. A method for producing the treatment element according to claim 1, comprising the steps:
    providing the main body with the outer wall, and
    forming the first wall sections and the second wall sections of the outer wall such that the first wall sections are harder than the second wall sections.

* * * * *